United States Patent [19]
Marlin et al.

[11] Patent Number: 5,680,615
[45] Date of Patent: Oct. 21, 1997

[54] DESKTOP MANAGEMENT OF HOST APPLICATIONS

[75] Inventors: James Warden Marlin, Longmont; Raymond Lowell Knudson; Thomas Michael Ruehle, both of Boulder; Anthony Franke Stuart, Jamestown; Edward Thomas Hughes, III, Arvada, all of Colo.

[73] Assignee: International Business Machines Corporation, Armonk, N.Y.

[21] Appl. No.: 334,584

[22] Filed: Nov. 4, 1994

[51] Int. Cl.$^6$ .............................. G06F 17/30; G06F 3/00
[52] U.S. Cl. .................. 395/614; 395/326; 395/601; 395/610; 395/615; 395/619; 395/786; 395/800
[58] Field of Search ............................ 395/600, 650, 395/700, 800; 364/200, 900

[56] References Cited

U.S. PATENT DOCUMENTS

| | | | |
|---|---|---|---|
| 4,251,858 | 2/1981 | Cambique et al. | |
| 4,495,572 | 1/1985 | Bosen | 364/200 |
| 4,862,345 | 8/1989 | Lekron | 364/188 |
| 4,933,967 | 6/1990 | Lu et al. | |
| 4,941,091 | 7/1990 | Breault et al. | 364/406 |
| 4,969,093 | 11/1990 | Barker et al. | 364/900 |
| 5,008,827 | 4/1991 | Sansone et al. | 364/464.02 |
| 5,077,694 | 12/1991 | Sansone et al. | 395/600 |
| 5,142,622 | 8/1992 | Owens | |
| 5,157,783 | 10/1992 | Anderson et al. | 395/600 |
| 5,161,223 | 11/1992 | Abraham | |
| 5,161,225 | 11/1992 | Abraham et al. | |

(List continued on next page.)

OTHER PUBLICATIONS

DMTF, (Aug. 29, 1994), "*Desktop Management Interface Specification*—Version 1.0".

DMTF (Oct. 31, 1994), "*Large Mailing Operations Standards Specification*—Version 1.0".

RD 298033, (Feb. 1989), "*Optional Placement of Processing and Formatting Information for Data Stream Tags*".

RD 298034, (Feb. 1989), "*Method for Providing Processing and Formatting Flexibility of Data Stream Tags*".

*IBM Technical Disclosure Bulletin*, vol. 37, No. 1, Jan. 1994, "Method for Consistent Interpretation of Accounting between an Agent and a Manager," Chen et al.

Shannon Gray–Voigt, "Bringing standard management fo desktop computing." Network World, Oct. 31, 1994 p. 62.

Steve Moore, "IMB Pledges Desktop Interface Support," *Computerworld*, vol. 28, Issue 44, Oct. 31, 1994.

David Buerger, "Back to reality," *Network World*, vol. 11, Issue 42, Oct. 17, 1994.

Skip McAskill, "DMIF Finalizes Desktop Management Specification," *Network World*, vol. 11, Issue 17, Apr. 25, 1994.

Shannon Gray–Voigt, "Bringing Standard Management to Desktop Computing," *Network World*, vol. 11, Issue 44, Oct. 31, 1994.

*Primary Examiner*—Thomas G. Black
*Assistant Examiner*—Cheryl Lewis
*Attorney, Agent, or Firm*—Charles E. Rohrer

[57] ABSTRACT

A communication medium and method enabling the identification of manageable data produced on mainframe equipment, so that the data can be established in a Desktop Management Interface (DMI) database. In that manner, management applications residing on desktop equipment connected to the DMI nodes can manage a complex process which includes mainframe equipment. The medium is a "tag" comprising a structured field which is sent from the mainframe to a desktop machine containing a server agent for generating DMI commands from the tag to address the database. In one embodiment, an exit agent is provided to split tags out of a mainframe generated datastream and send them to the server agent. The technique is extended to include desktop nodes so that tags can be produced and sent to the server agent for the generation of DMI commands.

12 Claims, 8 Drawing Sheets

U.S. PATENT DOCUMENTS

| | | | |
|---|---|---|---|
| 5,202,981 | 4/1993 | Shackelford . | |
| 5,220,674 | 6/1993 | Morgan et al. | 395/800 |
| 5,261,098 | 11/1993 | Katin et al. | 395/650 |
| 5,283,900 | 2/1994 | Frankel et al. . | |
| 5,291,602 | 3/1994 | Barker et al. | 395/700 |
| 5,381,470 | 1/1995 | Cambray et al. | 379/216 |
| 5,398,336 | 3/1995 | Tantry et al. | 395/600 |
| 5,406,322 | 4/1995 | Port et al. . | |
| 5,423,003 | 6/1995 | Bertrau | 395/200 |
| 5,485,370 | 1/1996 | Moss et al. | 364/408 |
| 5,502,839 | 3/1996 | Kolnick | 395/800 |

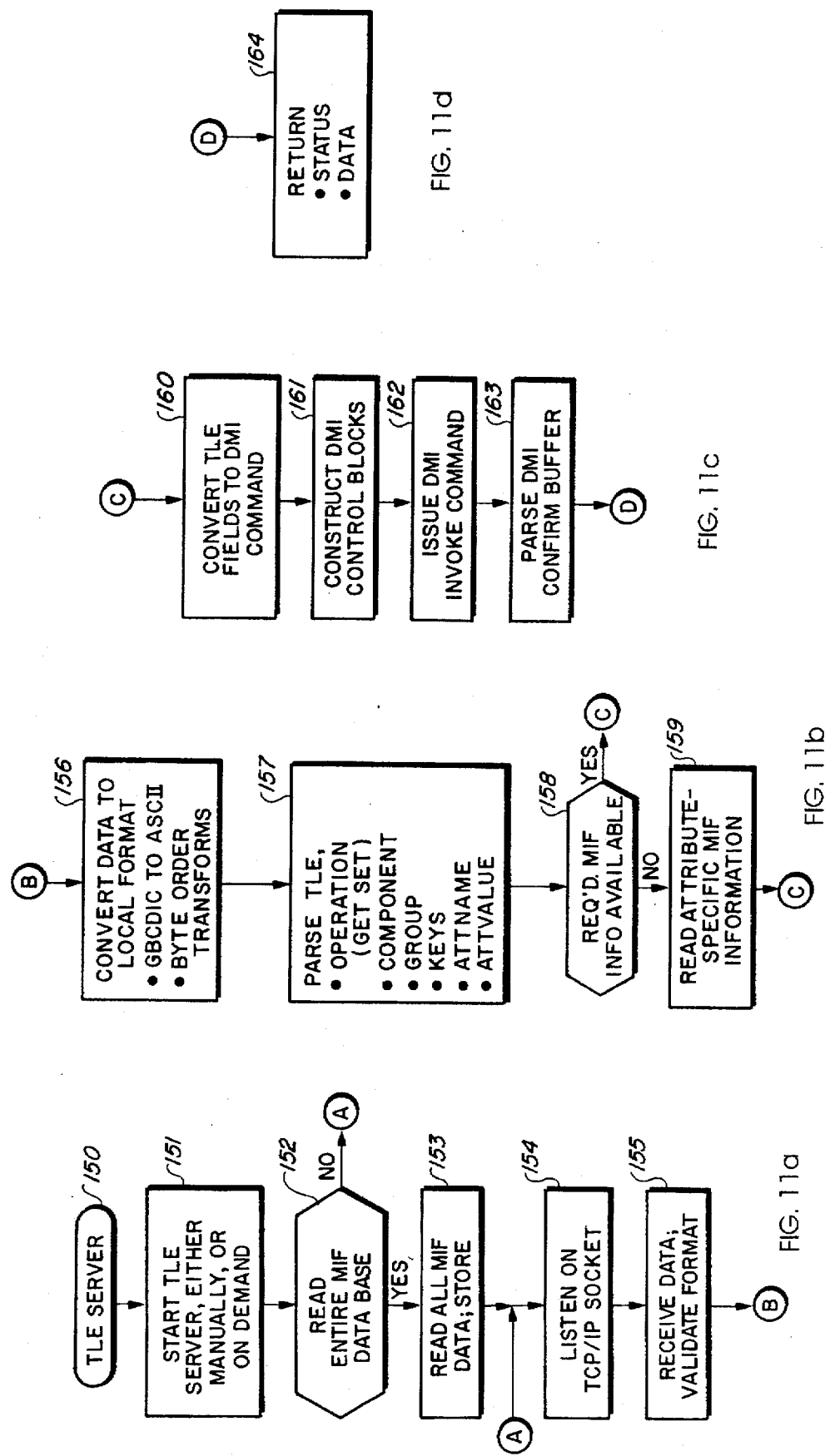

DESKTOP MANAGEMENT OF HOST APPLICATIONS

This application relates to the automated management of a complex environment wherein that environment includes a network in which host applications are run at one or more nodes and management activities are run at other nodes, which may be desktop devices.

CROSS REFERENCE TO RELATED APPLICATIONS

Several patent applications filed concurrently herewith relate to the invention herein. They are patent application Ser. No. 08/334,592 entitled, "Instrumented Components for Accessing Complex Object-oriented Data Files" now U.S. Pat. No. 5,546,577; patent application Ser. No. 08/334,948 entitled "Client Network Interface"; and patent application Ser. No. 08/334,810 entitled "Table Driven Graphical User Interface".

BACKGROUND OF THE INVENTION

The desire to develop control technologies in order to produce end-products more efficiently, or more cheaply, or of higher quality has existed for many years. Machines utilizing mechanical controls, hydraulic controls, or pneumatic controls were developed in the eighteenth century. With the advent of electrical technology, the increased ability to control the movement of work pieces from one work station to another down conveyor lines enabled a significant advance in the cost, efficiency and quality objectives of control technology. With the development of computers, particularly general purpose computers, control technology became much more flexible. Improvements in the control of a process could be effected by changes in software, as opposed to changes in hardware which were necessary on the earlier systems. Also, computer technology brought about the ability to automate processes not previously subject to machine control. For example, accounting work that was previously done by hand with the aid of simple adding machines or other calculating devices of that sort were automated by computerized systems to produce end-products in a much more efficient and less costly manner. The preparation of documents has been automated to some extent by the use of word processors. Generally speaking, computers have enabled the automation of information processes much the same as in an earlier day the electrical technology enabled the automatic movement of work pieces down a conveyor line.

The continued development of semi-conductor technology has enabled enormous computing capacity in very small computing elements. As a result, microprocessors have found use within machinery as control elements, replacing cams and gears and relays and other such devices of the previous control technologies. As a result the flexibility of programmed microprocessors is now available in many types of equipment. With microprocessor control of machines so pervasive, there occurs the need that various types of equipment in a work process be tied together and report to various processors which can manage the overall operation. Management may occur at the process level, i.e., to send a work piece from one work station to another and perform the operations called for, and it can occur on an information level as well, i.e., for example, processes can acquire information about machines so that they can be maintained prior to a breakdown, processes can schedule jobs, maintain inventories and automatically perform other accounting functions.

The particular complex environment in which the current invention was developed is the large mail room operation. In such an operation a variety of documents must be printed, fed along conveyor lines for correlation with other documents to comprise the particular mailing, through devices which may trim the documents, fold them, place them in envelopes and place them on trays. The envelopes will have a printed address so that a weighing mechanism may determine the postage that is needed and place the postage on the envelope. There are machines to sort mail according to zip codes and by walk sequence, i.e., the sequence that a mail carrier will follow delivering mail along a particular route. Finally, the outputs may be boxed according to the location to which they are sent and delivery automatically ordered for the next airplane leaving for that location.

In the large mailroom, information about recipients might be included in a database. For example, certain mailings may go to those people who are known to enjoy golf and other mailings may go to people who are in the dental profession. Some mail room operators may wish to track the effectiveness of marketing promotions. For example, people in a certain area might be targeted to receive a discount on an item and coupons for those people would receive a certain bar code. Another area might receive a different discount and have a different bar code. Later, once the coupons are returned, data relating the amount of interest developed by the promotion can be accumulated by reading the bar codes and automatically producing the reports.

As may be observed from the above description the amount of data which is organized in large mail room operations is enormous. It is not unusual for these operations to include banks of computers, banks of data storage equipment, various types of printers from many different manufacturers and complex inserting equipment capable of merging documents from several paths into one stack, folding, cutting, inserting, franking, sorting, and packaging.

In the current environment marks may be placed on the paper in a certain location so that scanning those marks can trigger the correct operation to direct that particular paper along its route to its destination in the proper envelope. Such marks can be on each page of a document or they can be on header pages. Such marks might require the trimming of a document before it is actually sent out to a customer.

FIG. 1 shows a simplified configuration that is utilized at the current time in print mail room facilities. The print job originates with application processes on a host 16 which is typically a large mainframe computer, making use of database facilities attached to the host. The generated print stream is converted into a device specific data stream and sent to the controller 11A of printer 11 for production of documents. An unwinder mechanism 10 is used to unwind rolls of paper and feed the paper into the printer 11. The printer output is passed to a folding machine 12 and organized on trays 13. The tray 13 is moved manually to provide input to a second line of machinery which may include devices to cut and trim the stacks of paper into individual documents and feed the documents through an inserting machine 14. Inserting machines are complex devices under the control of a microprocessor based controller 14A. The inserter may also receive documents from other document feeding devices and envelopes from another printing source for inserting the proper group of documents into a properly addressed envelope. The envelope may then pass through a franking machine and through sorting apparatus before being placed on trays 15 from which the properly sorted mail is packaged and sent off to the Post Office. An important advantage of the configuration as shown in FIG. 1 is that the printer line is separated from the inserter line of machinery. As a consequence the problems of matching the speed of these two lines is eliminated and printers are not held up by the operations of the inserters or vice versa. Such a configuration also makes the printer available for non-mail jobs. One of the important disadvantages is that marks are needed on each document or at least on header papers to correctly move the job through the equipment and into the proper envelope.

FIG. 2 shows a coupled configuration which is also in use at the current time. Again, the print job originates in the host 16 and in its large database and the print stream is sent to the controller 11A of printer 11. In this configuration an unwinder mechanism 10 unwinds a roll of paper for feeding to a printer 11, the output of which is directly coupled to the inserter line 14. The advantages of this type of configuration is that a folding machine 12 in the printer line is eliminated. Only a single operator is needed and the output of the printer is packaged for immediate mailing. An important disadvantage is that the operations of the inserter and the printer must be speed matched. Also, in this configuration the printer is dedicated to mail applications and the system is only as reliable as its weakest link. Marks on the paper are still needed to coordinate the documents from a printer with envelopes fed into the inserter from a different document feeder.

FIG. 3 shows a system which may be termed an intelligently coupled configuration. This system is similar to the configuration shown in FIG. 2 except that the controller 11A for the printer and the controller 14A for the inserter are enabled to exchange information so that as documents are printed, the printer can inquire if the inserter is ready. If it is, then the printer can send the document on to the inserter. This system enables the printer to communicate with the host 16 that originates the print job and provide the host with information about the inserting equipment that is connected to the printer. As a consequence, the system is enabled to ascertain the capabilities present on the equipment in the print path. This system also enables processes running on the host to advise the printer and the other equipment in the path when a job begins and when a job ends so that the need for marks on the paper is diminished or completely eliminated. This system also provides an error recovery operation such that if a job is completed without incident that can be recorded. This system provides software control over the process but still retains certain disadvantages. For example, the speed between the printer and the inserter still must be matched. The entire line is only as reliable as its weakest link and the printer is dedicated to mail applications.

FIG. 4 shows a network coupled configuration for which this invention is designed. The print jobs originate with application processes at a host 16 for generating a print stream sent to the controller 11A of a printer 11 in much the same manner as the other configurations described above. In this system, FIG. 4 shows an unwinder mechanism 10 is used to unwind rolls of paper and send them to a printer 11. It should be noted that paper input to the printer could be from cut sheet document feeders, a continuous form feeder or any other type of paper feeder. The output of the printer 11 is sent to a medium modifier 17 which may be, for example, a mechanism to imprint a color plate on a medium, or make a perforation cut on a page to be returned by a recipient. From the medium modifier, the document path leads to a folder mechanism 12 for stacking the documents on a tray 13. In this configuration the printer line is separated from the inserter line. Consequently, there is a movement of the tray 13 to the input of the inserter line which is illustrated in FIG. 4 as a manual movement. In this configuration there is direct communication between the controller 14A in the inserter 14 with the system manager located on the network 18. Likewise, the system manager has direct communication with the controller 11A of printer 11 and perhaps with other devices in the system that have microprocessor based control. The communication may be either direct or through communication with the controller 11A in the printer or the controller 14A in the inserter. In that manner, error recovery procedures maybe implemented throughout the system. The marks needed on paper are kept to a minimum. There still must be marks in order to identify jobs from the printer line when they reach the inserter. Speed matching is not a problem in this system since the printer line and the inserter line are separate and consequently the printer is available for non-mail jobs.

FIG. 5 is a more complete description of the system shown in FIG. 4 and shows that host 16 is connected into network 18. A customer application 20 is run on the host 16 to generate a print job. During that generation various value-add programs and indexing programs 21 may add to the print data stream and include data in the print files. Such programs may, for example, add bar codes for sorting files in zip sequence and generate the codes needed for proper finishing of the print job. Print files 22 and index files 23 may be created. Print Service Facility (PSF) 24 which also runs on host 16 will generate the print data stream for driving the printer 11. The system manager 25 resides on a work station which is connected into the network 18. The network may be either a local area network (LAN) or a wide area network (WAN). Also connected into the network are various work stations illustrated as graphical user interface (GUI) 26 and graphical user interface (GUI) 27 which may be placed in various locations for different purposes. For example, one may be at the inserter for the use of the operator of that line, one might be at the printer for the operator of that line, one might be at a warehouse for the warehouse manager to check the need for supplies as they are being used, e.g., paper, toner, etc.

In the system shown in FIG. 5, mutilated mail pieces are reprinted on demand on a smaller remote print station 28 attached to the network. In that manner, replacement documents are automatically generated as the system automatically senses the mutilation of a document.

FIG. 6 shows a generic interface model for the large mail room system of FIG. 5. Such a system is a coordinated set of hardware and software components and interfaces that work together to automate the output processes associated with high volume printing, finishing and delivery of individual mail pieces. Work begins in the data processing portion of the system with applications 20 that generate print data 20A. In many instances these applications are existing "legacy" applications on large mainframes that produce many types of large mailings such as, for example, the billing statements of utilities for customers. As shown in FIG. 6 the print data 20A from customer applications is further processed by value-add applications 21A and advanced function presentation (AFP) functions 21B that condition the data for printing and prepare object files 21C, D, and E for downstream operations.

In today's modern environment there are many tools available to assist in generating customized print output. Examples of value-add functions are programs which provide address verification, presorting of statements by their postal characteristics, programs 21G for building insertion instructions based on information contained in demographic and marketing databases and programs 21F for segmenting print data into manageable units of work.

Examples of advanced function presentation functions are services that convert line data into page data, build document index objects for locating individual groups of pages and building print files for reprint, viewing and archiving services for storing and retrieving the manageable printing units of work.

Host value-add programs and AFP services are designed to be application independent so that they do not require changes in the customer's print producing applications in order to perform their function. Once the VA and AFP process is complete the print files are scheduled for printing. Control information for the insertion process is separately sent to the finishing server when the finishing hardware is not in line in the print path. Bar code or optical recognition marks on the paper are used by the finishing server to correlate the finishing instructions for a print job with individual mail pieces to be assembled and packaged for postal delivery.

FIG. 7 shows a generic model of the system manager, mailing operations manager 30, which must provide a message handler interface 31 that is used by all of the various hardware and software processors 32A-G to define themselves to the system and report changes in status. Information about the processors 32A-G is maintained by the systems manager in a database called the Management Information Format (MIF) file 33. The system manager must also provide the request, reply, message interface 31 used by application agents to query status and obtain information about the products, mailing jobs and mailing pieces in progress over a network 34 providing client/server functions.

The system and models shown in FIGS. 5, 6 and 7 were developed by a council of users and vendors called LMO Systems Workgroup. That workgroup, comprised of research companies, is now known as the Data Management Task Force (DMTF) Finisher Workgroup, and was formed to identify key requirements of large mail room operations (LMO) and to explore the possibility of defining an open systems architecture standard for meeting them. This work resulted in demonstrating the capabilities of an integrated system at the "XPLOR" conference in November of 1993. The "Large Mailing Operations Standards Specification", Version 1.0, incorporated herein by reference, was published on Oct. 31, 1994, by the DMTF Finisher Workgroup and is available from DBM Printing Systems, Inc., Boulder, Colo. 80301-9191. It is the standard that has been developed by the workgroup to manage hardware and software processors in the large mail room operations systems environment.

The demand for standards is fostered by the need for selecting an architecture base that is widely accepted, easy to implement and extendable to future requirements. Customers and vendors alike need to feel that their solutions and products are built on interfaces that are durable and can take advantage of emerging technologies. In the desired system, easy to understand graphical interfaces commonly used on desktop computers are important.

In looking for currently available open systems standards for modeling the functions required in the large mail room operations (LMO) environment, the LMO standards work group discovered that the standard base that most closely meets these requirements is the DeskTop Management Interface (DMI). The DMI standard is managed by a group of companies calling themselves the DeskTop Management Taskforce (DMTF) who published the DeskTop Management Interface Specification, Version 1.0 on Apr. 29, 1994, incorporated herein by reference. The publication may be obtained from any company who is a member of the taskforce including IBM Corporation, P.O. Box 1900, Boulder, Colo. 80301-9191.

Implementations of the DMI are available today or committed in OS2, Workplace OS, DOS and AIX. Other platforms are sure to follow. By building LMO objects and management protocols on the DMI, LMO standards may be established in a uniform manner across all of these platforms.

In the terminology of DMI, components are physical or logical entities on a system such as hardware, software or firmware. Components may come with the system or may be added to it. The code that carries out management actions for a particular component is known as "Component Instrumentation". FIG. 8 shows a generic model of the DMI.

A management application 100 is a program that initiates management requests. A management application uses the DeskTop Management Interface to perform management operations. The management application is exemplified by a program such as an application with a graphical user interface (GUI), an application program agent, or it may be a network management protocol agent that translates requests from a standard network management protocol such as SNMP or CMIP to the DMI and back again.

The service layer 102 coordinates access to component instrumentation and component provided data in the Management Information Format (MIF) database 104.

One may note the natural relationship of the DMI model shown in FIG. 8 with the LMO model shown in FIG. 7.

In the use of the DMI, component descriptions are defined in a language called the "Management Information Format" (MIF). Each component has an MIF file to describe its manageable characteristics. When a component is initially installed into the system, the MIF file for that component is added to the MIF database 104 for use by the service layer.

The component interface (CI) 103 is used by component vendors to describe access to management information and to enable a component to be managed. The CI shields vendors from the complexity of encoding styles and management registration information. Vendors do not need to learn the details of emerging management protocols.

The management interface (MI) 101 is used by applications that wish to manage components. The MI shields management application vendors from understanding the different mechanisms used to obtain management information from elements within the system.

The CI and MI are data interfaces as opposed to procedural interfaces. Data blocks are used as the format for data transfer—not parameters to a function call. The behavioral mechanics of the CI and MI make up the data transfer mechanism.

The service layer (SL) 102 is an active, resident piece of code running on a computer system that mediates between the MI and the CI and provides access to the database 104.

It should be noted that the DeskTop Management Task Force which developed the DMI did so to close the gap between management software and the system components that require management on a desktop computer. Within a computer system, the DMI has been designed to be independent of any specific computer or operating system. It is designed to be independent of any specific management protocol. It is designed to be independent of a network but it is designed to be mappable to existing management protocols, e.g., CMIP or SNMP. Basically, however, the DMI is designed for a single desktop computer where components are physical or logical entities on the computer system, such as disk drives and word processors. The DMI does not address or specify a protocol for management over a network but the prospect of managing several desktop computers within a network was considered by the DeskTop Management Task Force. The LMO standards work group has greatly extended the vision of the DMI by applying it to a network which not only includes desktop computers, but also includes complex machinery, such as document finishers and inserters. Moreover, the vision of the DMI is extended to include large mainframe host equipment and processes running thereon. The LMO system calls for defining the manageable characteristics of complex machinery and the manageable characteristics of mainframes and mainframe processes in an MIF database so that these characteristics can be managed from a workstation or desktop computer or any GUI on the network.

SUMMARY OF THE RELATED INVENTIONS

In implementing the large mail room system manager model on the DMI interface several problems were revealed which resulted in the inventions which are the subject of this patent application and the related patent applications named above.

In a large mail room operation there are many hardware and software processes to be managed and many management applications requiring access and control over the manageable data. Most of these processes and management applications are located on, or controlled by computing systems other than the particular computing system containing the DMI and the MIF database. To satisfy the networking requirements of the large mail room operation, the DMI model needed to be extended to provide for client/server communication in a manner that preserved the syntax and semantics of the DMI standard, while enabling the service layer to continue to dynamically coordinate and arbitrate requests from the management applications to the specified component instrumentations. Related patent application Ser. NO. 08/334,948 provides a solution to this problem. It was observed that because the nature of the service layer is to provide support that handles run time management of both the management interface and the component interface, simple request/reply, client/server protocols would not suffice. To solve this problem has required the invention of a network client protocol capable of handling three-way dialogues between clients, servers and instrumented components all residing on different nodes. To do that the client interface was established by supporting all of the functions of the MI and the CI at each of the required client platforms. This is accomplished by porting DMI function calls to those platforms and implementing them on a "Remote Procedure Call" (RPC) base using Transmission Control Protocol/Internet Protocol (TCP/IP) as the transport carrier. The underlying RPC support is handled by the client interface code and is transparent to the DMI programmer. The invention enables operation in a consistent manner across a variety of operating systems, hardware platforms and different architectures. In addition, it is capable of allowing a client implemented on one architecture to inter-operate with a server implemented on another. The invention preserves the semantics and syntax of the MI and CI, while enabling data transfer mechanisms to and from client, servers and instrumented components, all of which may reside in different nodes in the network.

A problem confronting the inventors was to find an answer to common workflow-related questions, such as, where is a particular mail piece? In a large workflow-oriented system environment, like the environment for large mail room operations, there are a number of process steps that must be performed on a named unit of work, such as a mail piece, to answer such a query. Each process step is a manageable component with its own characteristics, its own processing states and a status that may be modeled and managed in the LMO system. Object-oriented models of mail jobs are best represented by tables of transactions for each of the many hardware and software process steps required in the mailing. Since a single mailing may have upwards of one million mail pieces, and a given LMO system may have multiple mailings active at the same time, rapid access in update of transaction entries in these tables is both a requirement and a challenge. Existing table management protocols in object-oriented environments, such as SNMP and CMIP, are not adequate to meet the volume and performance requirements of an LMO system. Database systems on the other hand, provide efficient query and reply access to large databases, but fail to provide modeling and reuse capabilities required in LMO systems. The invention described in related patent application Ser. No. 08/334,942 solves this problem. It provides instrumentation logic to efficiently develop all of the many DMI commands that are necessary to answer a management query such as "Where is the mail piece?" The invention shields the user from the need to understand the details of the MIF file and develop himself all of the necessary commands to obtain the data. The invention has also been carried further in that speed in answering the query is improved by providing instrumentation logic to map object-oriented protocols to efficient data management protocols to provide direct keyed access to mail job data located in a specially created database utilizing available database products such as DB2. The novel techniques herein provide instrumenting groups that are used for passing parameters and returning values for complex queries while using the standard facilities of existing management protocols. An example of the usefulness of the invention in the LMO environment is, for example, to track mail piece data. To do that, a group may be defined with attributes that are set to specify the mail piece and mail job identifiers. These attributes are input arguments for the search. After setting the search attributes, the management application issues a DMI "GET" command for the current value of the location of the attribute of the group. The DMI service layer responds by invoking the inventive instrumentation for the tracking component. The instrumented code issues all necessary commands to query each active process, locate the mail piece and return the location value. The instrumented code itself is a management application that uses the standard DMI interface. In other object management environments, such as SNMP, access may be provided through agent programs. The selection of the underlying database manager may vary from implementation to implementation and is transparent to the management application requesting the access.

A problem addressed by the inventors relates to the need for various management applications at various nodes to access the same data in the database for different functions in different report formats for different purposes. For example, a supply low event attribute may require the attention of a machine operator on one node. It may trigger an inventory transaction at a second node and it may cause rescheduling of mail jobs to match work with available supplies from a third node. Each of these functions and others may be performed by different users at different nodes in the LMO installation. Object-oriented modeling of the large mail room environment enables large volumes of attribute data associated with each step in the mailing process to be captured and maintained in the database. Attributes about products, mail jobs, insert jobs, printers, inserters, supplies, machine set-ups and finishing instructions may all be found in the object model of the various components of the system. The problem of accessing all of that data in various ways is compounded by the need to allow the object database to grow over time and report formats to change without requiring reprogramming to access new functions. Another difficult requirement is to allow customization of reports on an attribute by attribute basis for different users of the system. Related patent application Ser. No. 08/334,810 provides a solution to this problem. To meet these requirements a table-driven technique has been invented that recognizes the generic structure of components, groups and attributes in any MIF file and defines the mapping of any attribute value in any component to any column in any window on the display in any order. The mapping of a specific collection of attributes to a particular window is called a report. Multiple reports may be associated with a particular user who is authorized to view and interact with the data to accomplish a task in the LMO system. The report definitions supported by this invention enable each attribute in a report to be controlled or monitored individually. The control functions provided include the ability to add additional controls as they become required and is provided for by the report definition structure.

SUMMARY OF THE INVENTION

A problem faced in implementing the system manager models involved the many legacy applications running on mainframe platforms to prepare print jobs. In a large mail room operation there are many applications and value-add processes running on mainframe computers that need to be tracked and managed as an integral part of the mailing operation. Examples of these are programs which generate print output, like bills for mailing; programs which pre-sort customers' statements by postal characteristics; value-add processes that add bar code data to print images and build finishing instructions for individual mail pieces; and programs that further condition data objects for archiving, printing and insertion process steps in the workflow path of mailing. In many instances, these applications are not capable of generating direct calls to set values and report status in the DMI databases so that they can be managed using the standard management interfaces defined by the DMI. This patent application provides a solution to this problem. Because the Characteristics of host programming can vary from one host system to another, it was determined that a data stream solution would be preferred to a procedure based program call solution. In the invention, agent programs to set control parameters in the DMI database for use by management applications are provided, so that tags inserted in the data stream can be fielded by the agent programs and converted into the proper format for setting control parameters in the DMI database. The basic building block of the invention is a self-defining "Tag Logical Element" (TLE) structured field which was already available in the Advanced Function Printing architecture. The TLE structured field in turn is comprised of two self-defining fields called triplets. One triplet identifies the TLE as a tag for setting DMI values. The other triplet contains the parameters used in setting specific attribute values in the DMI database. An instrumented agent is provided as an exit program in the host to split away the TLEs and send them to an agent program in the server to interpret the tags and generate the DMI commands. The tags may be placed in the print stream by the applications themselves or by value-added processes at the host. Once the invention had been generated for application programs at the host, it became apparent that any program which generates TLE tags could submit those tags directly to the program agent in the DMI server and establish values in the MIF without needing to utilize C-language programming to interface with the MI. In this manner, management applications at any node in the system, not just a host, can utilize the simple TLE mechanism to set attribute values.

BRIEF DESCRIPTION OF THE DRAWING

The invention is set forth in detail below with reference to the accompanying drawing a brief description of which follows.

FIG. 11a–11d show the processing steps performed by a server agent at the DMI node.

DETAILED DESCRIPTION OF THE INVENTION

Figure 1:
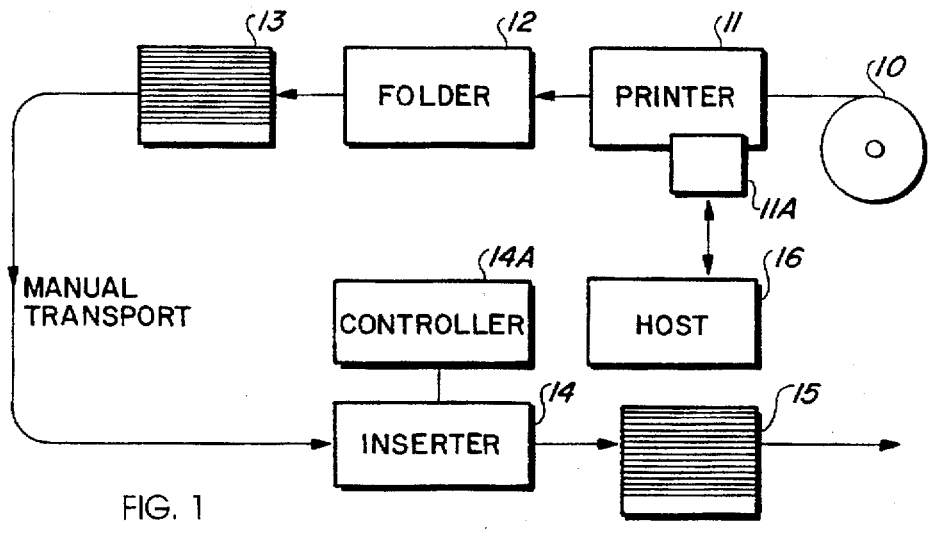
FIG. 1 shows a simplified configuration of a large mailroom system with a printer line for document preparation separate from an inserter line for accumulating documents in an envelope.
Figure 2:
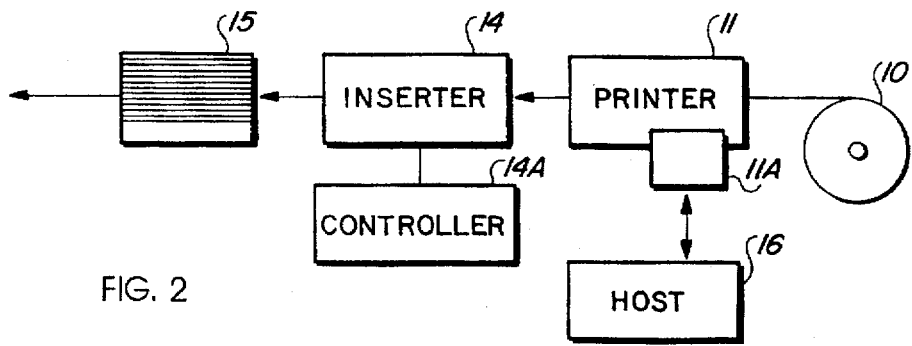
FIG. 2 shows a large mailroom system configuration with the printer line coupled directly to the equipment in the inserter line.
Figure 3:
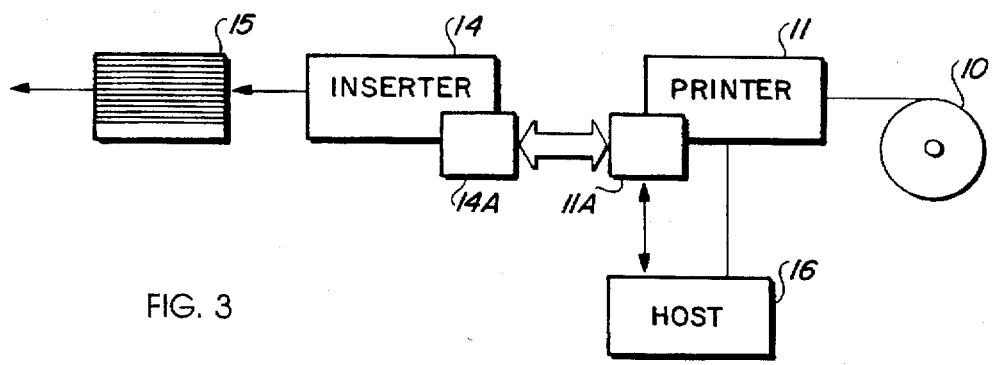
FIG. 3 illustrates a large mailroom system configuration wherein the controller of the printer is enabled to exchange information with the controller of the inserter.
Figure 4:
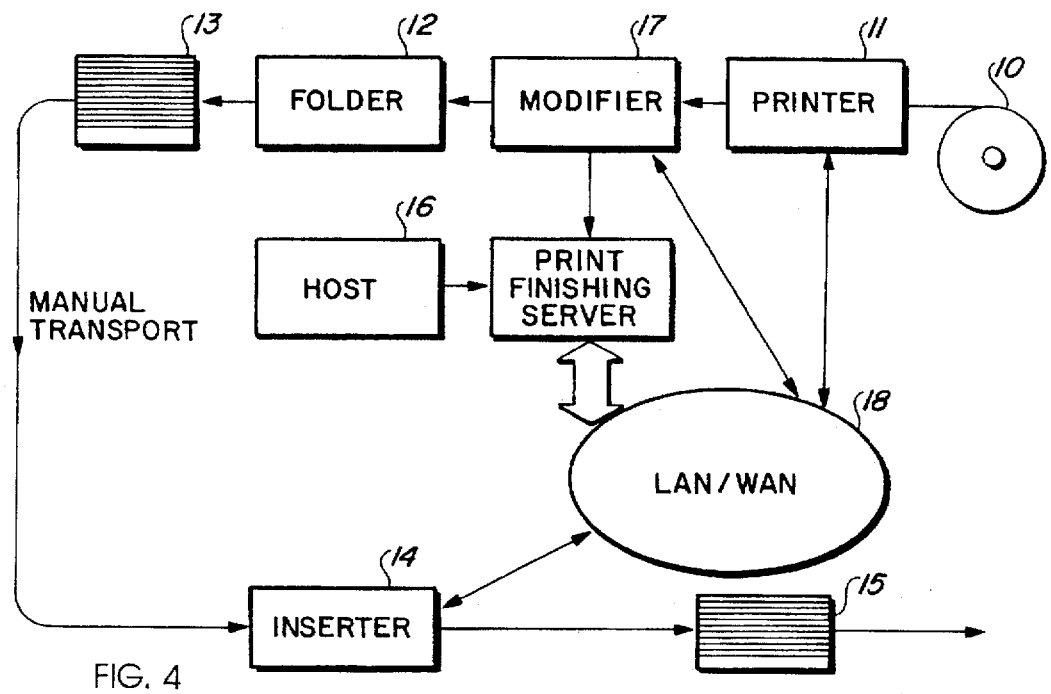
FIG. 4 shows a large mailroom system configuration wherein the output of the printer line is not directly coupled to the input of the inserter line, but the two lines are coupled over a network. The invention herein is designed for the network coupled configuration.
Figure 5:
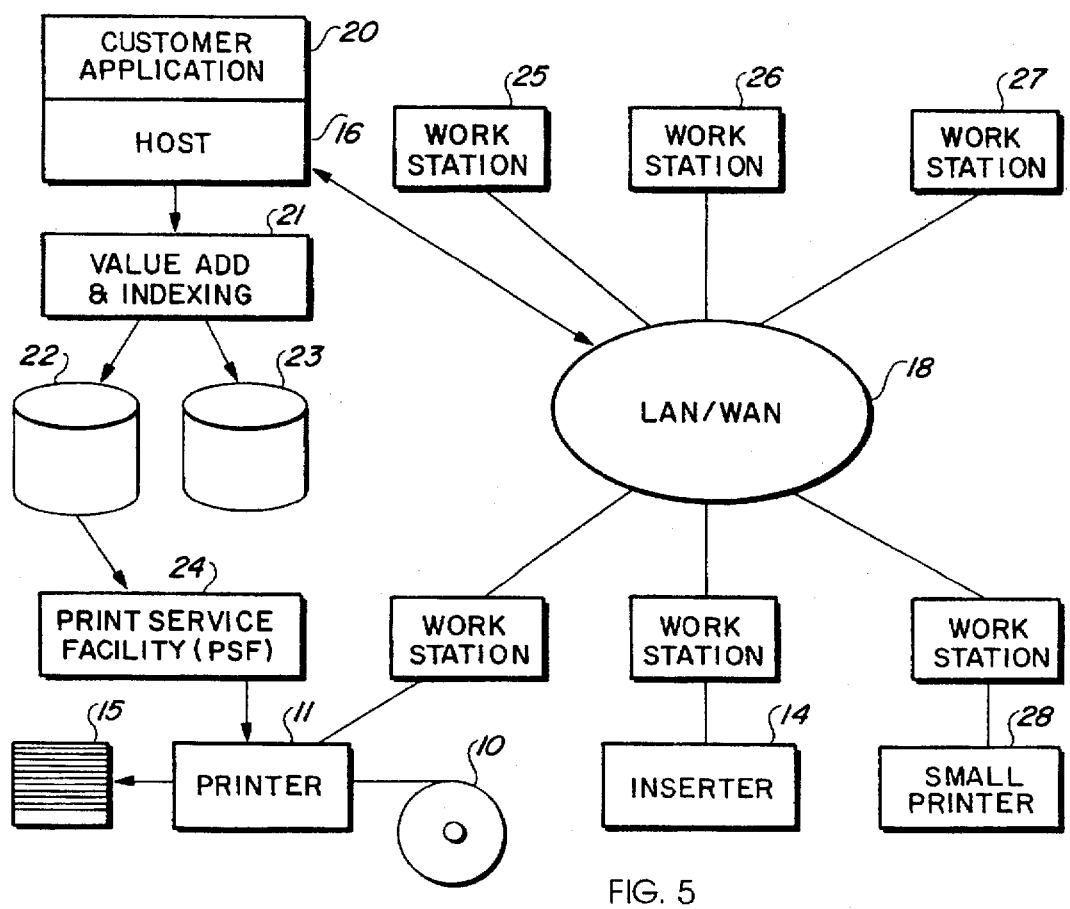
FIG. 5 shows a more complete depiction of the large mailroom network coupled system configuration of FIG. 4 and shows that a host or "mainframe" computer originating print jobs is coupled to the network together with many workstations which may be based upon desktop computers.
Figure 6:
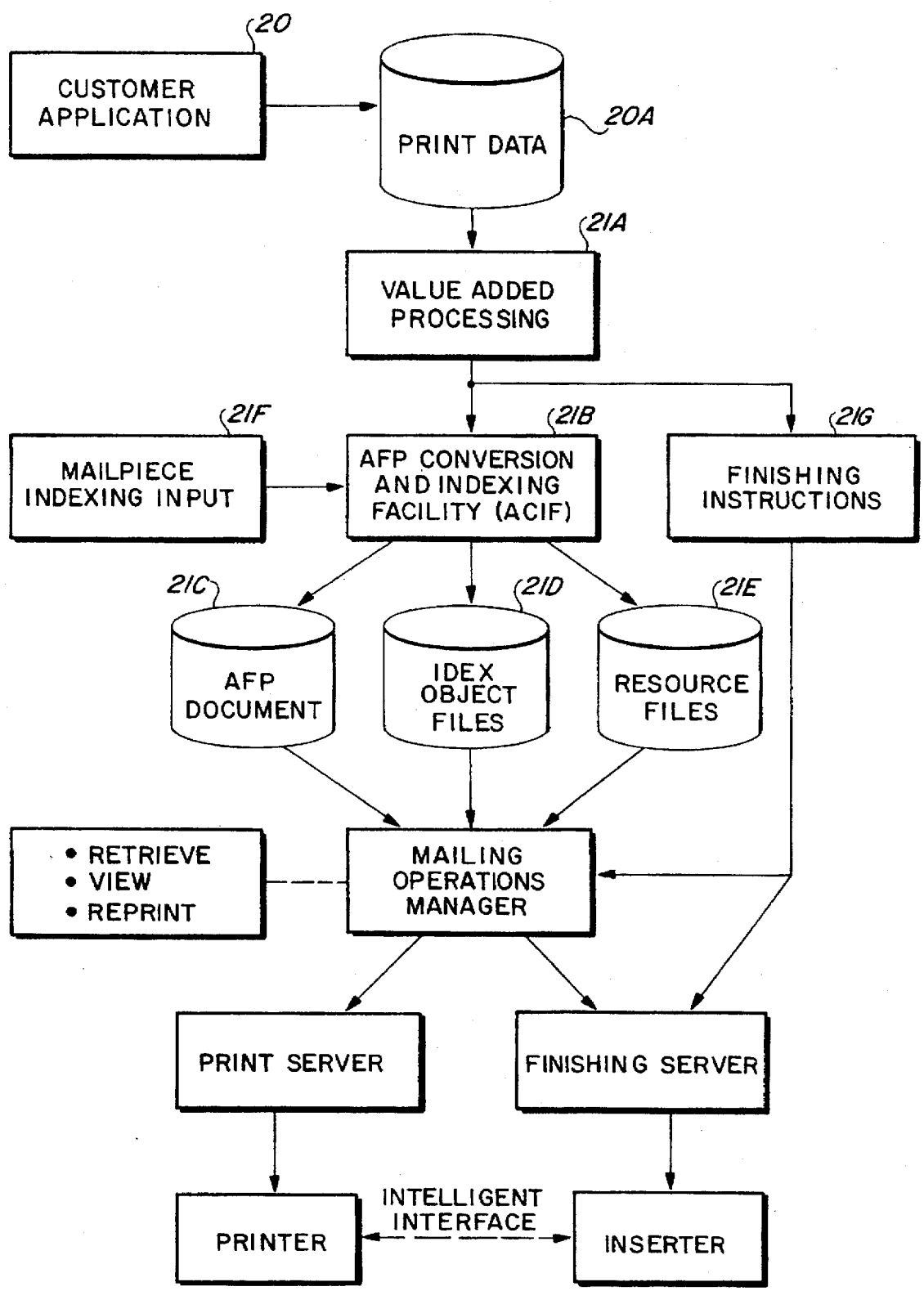
FIG. 6 shows an interface model of the system of FIG. 5 with many of the software and hardware components that must work together to automate the production of the individual mail pieces.

When reference is made to the drawing, like numerals indicate like parts and structural features in the various figures.

Figure 7:
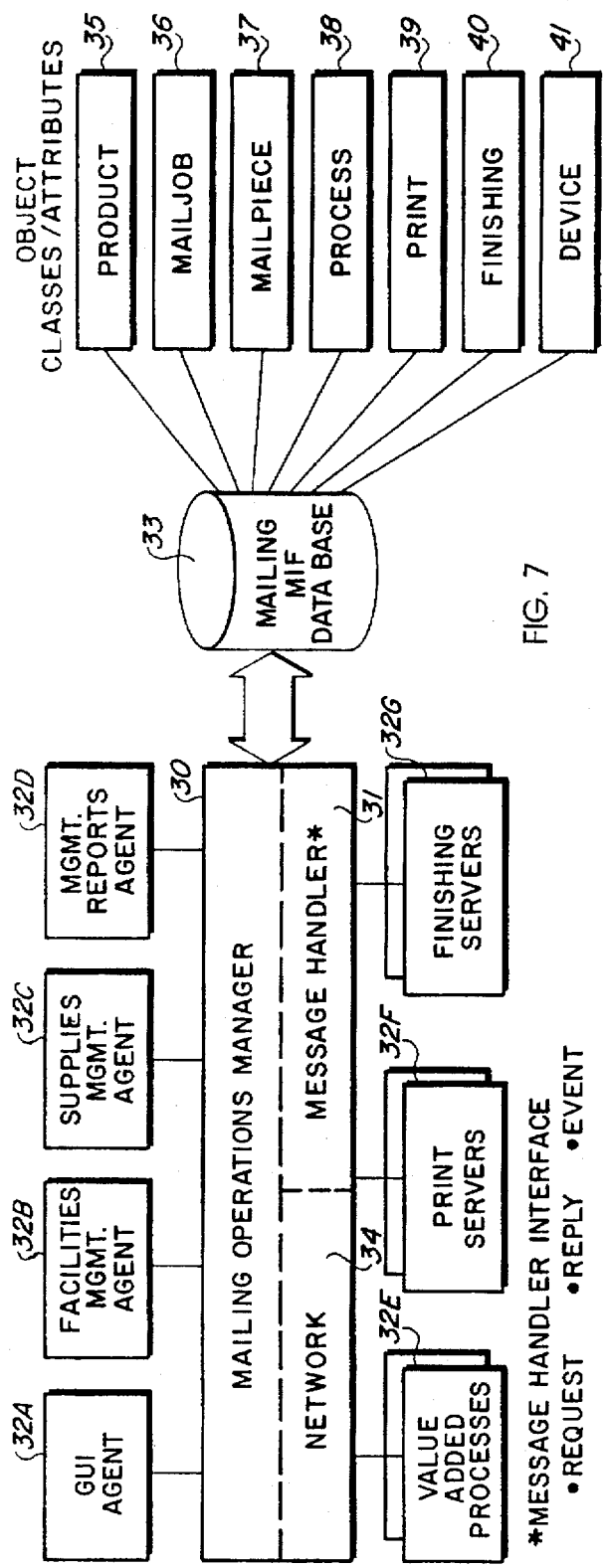
FIG. 7 shows a model of the mailing operations manager developed to control the large mail room operation by providing an object-oriented database into which all of the various hardware and software components can define themselves and report changes in status.
Figure 8:
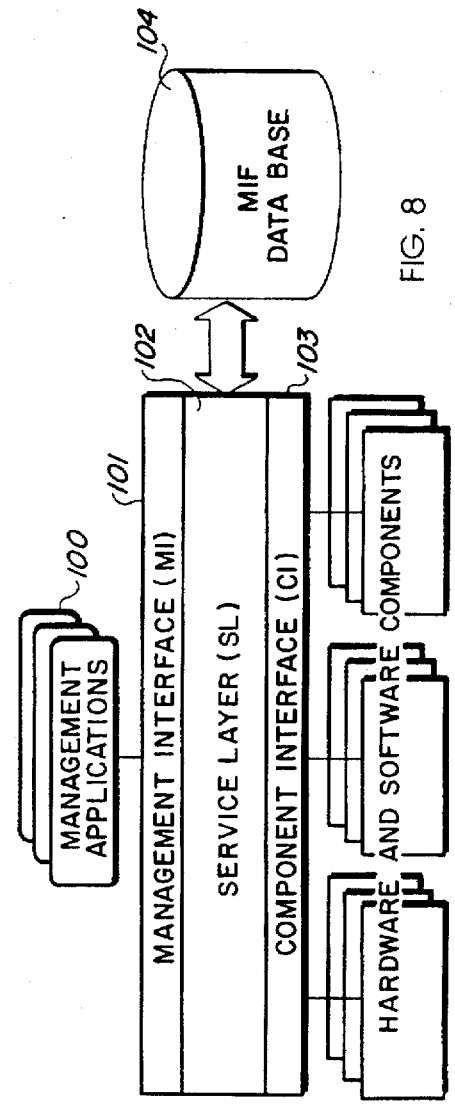
FIG. 8 shows a model of the "Desktop Management Interface" (DMI) developed to manage the hardware and software components of a desktop computer, regardless of variations in operating system software, application software or hardware components comprising the desktop computing system. The desktop model of FIG. 8 is extended herein to describe the network model of FIG. 7.

FIG. 7 is a model of the systems manager and shows various objects for the object-oriented database 33 which have been defined by the LMO standards work group. These are various object classes which were considered important in managing the large mail room operation. Object class 35 is the product object which describes the name and the attributes of a mailing, for example, a product may be a mailing of bills. The mail job object class 36 is an object which identifies a manageable segment of the total product. For example, a mail job may be two thousand accounts within the total billing product.

The next object class is the mail piece object 37 which describes a specific set of pages that go into a particular envelope, for example, that set of pages that go into making up one particular bill to one particular customer.

The process object 38 contains a description of the steps that a mail piece must go through for it to be created, printed and mailed.

The print object class 39 will include data files for the various devices in the system that put marks on paper, for example, an IBM 3900 printer.

The finishing object 40 contains MIF database objects which describe the attributes of those devices that do the processing on the finishing line. For example, the manageable attributes of an inserter machine or a sorter or a document feeder or a franking machine would be the type of object found under this object class.

The device object class 41 is for other equipment which may be used in one of the processes interacting on the mail piece. For example, this object class would include a database on color imprinters.

Also in FIG. 7 various so-called agent programs 32A–32D are illustrated. A facilities management agent 32B is a program that would be developed by the owner of a mail room operation to manage the particular facilities included within that operation. The supplies management agent 32C is a program which would be developed and supplied by the owner of the large mail room operation to implement the management of supplies needed within that operation, for example, postage, toner for printing machines, paper, etc. The management reports agent 32D reflects those various programs which would be developed by the owner of a large mail room operation to obtain the particular type of management information that is needed from the database 33. For example, a management report agent might be developed to obtain information relating to the scheduling of mail jobs within the entire operation, so that for example, if one printer line is down, the mail job may be scheduled into the workflow for another printer line. In addition to these agents, other agents may be developed for a particular installation. All of these agents may operate from the same node or from different nodes on the network but it is envisioned that each of these agents will be located in the most advantageous location within the operation. All desktop computers will be provided with the GUI agent 32A to establish the interface for all other agents to the mailing operations manager 30. The GUI agent is not supplied by the owner of the large mail room operation, but rather is supplied with the systems manager to provide a generalized interface for all GUI nodes.

In implementing the DMI standards, management information files (MIF) must be created in adherence with the DMI format. Files created in that format describe components which have attributes that have values and whose attributes can be assembled into groups.

A DMI component is any hardware or software device that can be connected to a computer system. In the LMO environment, this definition is extended to include such things as printers, inserters, status collectors, and various pre- and post-processing mechanisms.

An attribute is a characteristic or function or feature of a device, specifically a relevant and manageable characteristic. An attribute is a feature or function that a device manufacturer defines for expressing data values about the attribute. Applications systems used to monitor and control the device utilize attributes to manage it. An example of an attribute is the supplies that a printer uses.

A group is a "group of attributes". Attributes are assembled into groups based on their similarity of function or purpose. Examples of groups include such things as the input characteristics of printers or their output characteristics.

Attributes of devices have values attached to them. Some of these values are static values such as the name of the manufacturer of a printer, while other values are dynamic such as the number of pages that a printer has printed since it was installed.

MIF files are files describing components and their attributes. Each device manufacturer provides an MIF file that describes the characteristics of the device that can be managed. The MIF file is installed into the database of the system. The device makes itself known to the system through the MIF database.

Note that the system manager expands the DMI concept of a "component" to include not only hardware and software devices but also mail jobs and mail pieces in products being handled in the large mail room environment. Utilizing files developed in the MIF format, the system manager provides an interface to handle messages from devices and computer systems to create and update files about mail jobs and mail pieces. The system manager also provides interfaces so that users can query device status and obtain information about the various products, mailing jobs and mail pieces flowing through the system.

A third set of standards with which the system manager is compliant is the Advanced Function Print Data Stream (AFPDS) standard. This standard is described in "Mixed Object Document Content Architecture Reference," Document Number SC31-6802-02, Third Edition, June 1993, IBM Corporation, Department 588, P.O. Box 1900, Boulder, Colo. 80301-9191, USA, and is incorporated herein by reference. This standard includes a data stream format that supports graphics, text, barcode and resources such as fonts, overlays, page segments, form definitions and page definitions. The reference describes data stream tagging, page 140 et seq. As described herein, data stream tagging is used to identify individual mail pieces and to track them through the printing and inserting process. Tagging product data streams allows a break up of a data file into logical documents, each identifying a particular mail piece or recipient. Such tagging allows not only the tracking of mail pieces through the printing and inserting process, but also allows logical documents like mail pieces to be retrieved, viewed and archived.

In creating the system, it is important that devices of all kinds from different vendors should be able to be connected to the mailing system without requiring modifications. In addition, the system must be extensible, that is, it should be possible to add services, commands and actions without requiring redesign of the system. Also, the system should be based on a client/server model to take advantage of the versatility afforded by networks. The system should use graphical user interface technology. An additional requirement of the system is that it should be portable across different operating systems and types of computing machines. Finally, the system should be configurable, that is, users should be able to tailor the data in the system to their own management requirements. The LMO systems work group has provided a standard to meet all of these requirements.

Each component, which may be a device or mail job that is added to or installed in the system, must have an accompanying management information format (MIF) file to describe the manageable aspects of the component. By adding the MIF file to the database, the component is made known to the system and thereby is made available for responding to management commands. Vendors of devices who wish to be compliant with the DMI format must supply MIF files for their devices and installation programs to present the MIF file to the database through the service layer.

In the database, attributes may be a single valued entry or they may be group attributes defining a table or array of related attributes and their values. An example of a group attribute that defines a table is "printer supplies". Since there may be several different supply types such as paper, toner, fuser oil, etc., each with different attribute values, the attribute "printer supply" points to a table or array of supply types and their attributes, rather than to a single value. Whenever the various attributes in a group define one or more rows in a table, a key is needed to define the attribute IDs that are used as indices to the table. By use of the key, the particular row and attribute in the table is found.

The DMI recognizes that some attributes represent static information, for example, the name of a vendor, and also include dynamic information, for example, the amount of paper on the unwinding machine. To obtain static information the request for an attribute value is fielded by the service layer and reference is made to the MIF database to answer the query. The same approach may be used for dynamic values. However, the database attribute value may not have been updated for some time. To obtain current values of dynamically changing attributes, the DMI makes available "component instrumentation" code for acquiring the attribute value from its source. When component instrumentation is used, the service layer branches to the component instrumentation to obtain the latest value for that attribute.

The description of each component in the MIF database is established according to a standard definition and utilizes clear text. The definition is of a component with groups and the attributes of those groups. The MIF format provides a keyable data structure. Once the description is in the system, the service layer enables the traversing of these different objects to monitor the values of the attributes in order to provide the data from which reports can be generated. A clear text file is one in which there is no particular formatting other than perhaps a delimiter, such as carriage return. Consequently, it is easily keyable information which may be described in any human language, English, German or whatever and translated into an ASCII database for use by the computer.

The management interface (MI) interfaces with the management applications to provide access to the data base for management functions. The command "DMIGET" would be used primarily by the management applications to request information through the service layer for a particular component. The service layer acknowledges receipt of the message and issues as many requests to different component instrumentations as necessary to satisfy the management request. If the initial request was for static information, the service layer would find that information in the database. If however, the request was for the current state of a device, the service layer would act as a mediator between the requestor and the component and would address component instrumentation through the component interface (CI) to obtain the current status of the device. Once ascertained, the current state would be passed on to the management requestor through the management interface. The command "DMISET" might be used by the hardware and software components through the component interface (CI) or by management applications through the MI to set information in the data field. All of the DMI commands and the control blocks for those commands are set out in the DMI specification which has been incorporated herein by reference.

The current invention is directed at the problem of getting information to the system manager on the network 18 from print jobs run on mainframe apparatus that lack the ability to issue calls to the DMI interface. The solution provided is to place tags in the data stream produced by the so called "Legacy" programs running on host mainframes so that these tags appear in the print data stream. In the particular implementation described herein, an exit program is provided at the host for splitting these tags out of the data stream and sending them to a second agent program located at the DMI server node. The second agent program interprets the tags and produces the needed DMI commands to establish attribute values in the database accordingly. Information is collected from the host so that the system manager can monitor the job and manage it. In the LMO application, these tags are actually in the print data stream so that there is a close correlation between jobs currently being printed and the tags.

Tagging works from a so called "Tag Logical Element" (TLE). The structure of the TLE has previously been defined in Advanced Function Printing architecture and that structure is used herein for controlling the printing operation and accumulating data in the DMI database. By interpreting the tags, the agent programs are enabled to establish values in the database where they can be managed. Such programs are agent functions for the application program.

In the particular embodiment described herein, the agent program has been split into two components. One component is an exit program within the print service facility at the host to split the tags out of the data stream and send them to the second part of the agent located at a desktop computer containing the DMI database. The second agent interfaces through the DMI to set values in the database. Henceforth, the agent program at the host will be termed the "exit agent" while the agent program at the DMI node will be termed the "server agent".

With the server agent program at the DMI node, the capability of establishing values in the DMI database through the use of the TLE structure is made available not only to the application programs at the host, but to all other nodes as well. That is, the TLE structure can be prepared at any node and sent to the server agent in order to generate the appropriate DMI commands. In that manner, the development of a very simple structured field can be used rather than the complex DMI interface providing a significant savings in the time of preparing programs to generate DMI calls. To further the simplicity of the TLE route, an application program interface (API) has been developed to interface with C language programs at any node on the system including the host for the development of the TLE tags. Also a utility program for building TLEs entitled "BLDTLE" has been provided to make the development of the TLEs simpler yet. The utility takes as input a simple structured file and interprets that to develop the TLE format.

Figure 9:
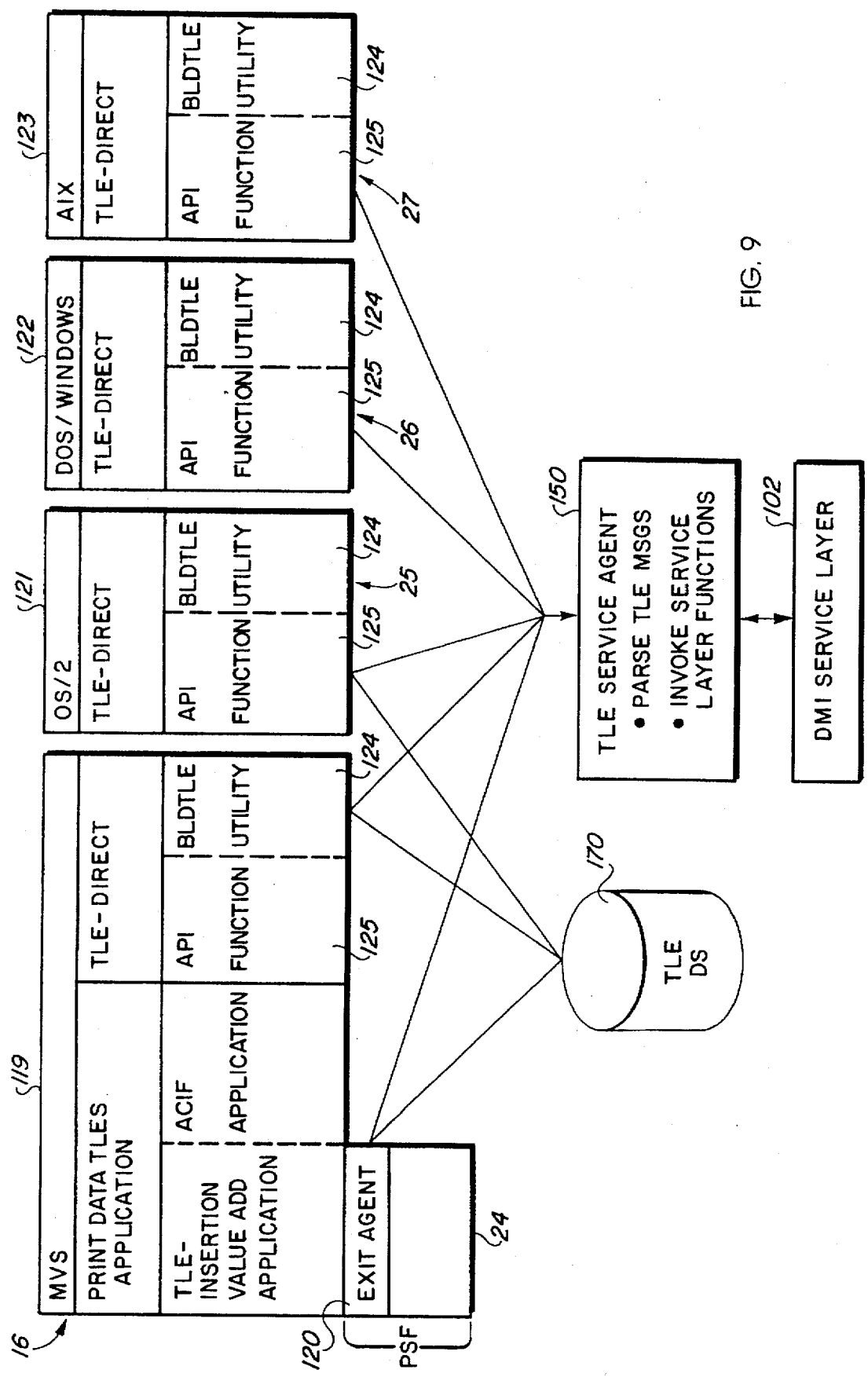
FIG. 9 shows a system overview of the invention herein which is designed to establish values in the object-oriented database for host processes.

FIG. 9 provides a system overview of the generation of TLE tags and the sending of those tags over a network to the server agent to the DMI service layer. In FIG. 9, the host system 16 is shown as having an MVS operating system 119. Tags can be generated at the host either by placing the tags in a data stream and splitting them out of the data stream by the exit agent 120 or by generating the tags and presenting them directly to the server through the TLE direct approach.

A second node 25 on the system is illustrated as a desktop computer running the OS/2 operating system 121. The TLE direct approach is used to build tags and send them to the server agent. Another node running on desktop computer 26 is shown running on a DOS/Windows platform 122 also utilizing the direct approach for the generation of tags and sending those to the server agent. A third node on the network 18, shown as desktop computer 27, utilizes an AIX operating system 123. Tags are built at that node and sent directly to the server agent. The TLE server agent 150 may be located at still another node on the network or at any one of the previously mentioned desktop nodes. The server agent 150 will be advantageously placed at the node that includes the DMI service layer 102. If there is more than one location in the network with the DMI interface and MIF database, another server agent must be at that node if it is to have the capability of receiving and responding to TLE messages.

At the host 16 tags are generated and inserted into the print data stream by either the application program itself or value-add programs. They may also be inserted into the data stream by making use of the Advanced Function Printing Conversion and Indexing facility (ACIF). All of these techniques exist in the prior art. In this system however, the host is connected into a network and it is required to split the tags out of the data stream and send them to the server agent 150 at a different node on the network. For the LMO system, this function is advantageously performed as the data stream leaves the host to drive the printer. Consequently, exit agent 120 has been developed to perform that function as one of the final processing elements of the print service facility (PSF) 24.

The type of information for which tags are placed into the data stream identify the manageable characteristics of the application, that is, the process itself, accounting information, the print job characteristics, the various print sources associated with that print job, the file name of the print job, etc. Some of this information is not known at the time the tag is generated, for example, the start time for running the print job. Therefore the attribute value for that tag could not contain meaningful information at the time the tag was generated and put into the print stream. However the exit agent 120 can ascertain values of that nature and when it splits the tag away from the data stream, place into the attribute field the proper value. Other attribute values such as the print file name can be created by the user or plugged in by the job entry sub-system (JES). Still other information such as the formdef is provided by the user but the information is plugged in through job control language (JCL) and JES. The plugging in of values in TLE structured fields is performed in the prior art.

As mentioned above, tags may be placed into the print data stream by the application program itself, by the utilization of the ACIF facility or by value-add applications. Value-add applications might be useful for example, in establishing all of the global information about a print job. Another example might be to utilize an application that already exists to sort mail according to zip code. A value-add application can be run just prior to the zip code application to establish a start time and a second value-add application run at the conclusion of the zip code application to establish the end time. In that manner, needed accounting information for management applications at desktop devices is developed without modifying the host zip code application in any way.

The ACIF facility is a program that, given an input from the user relating to the print data, and based on what is found in the data stream, the ACIF builds an index object for that print data stream. The index object may include the start of the print job, the pages within the print data in terms of offset from the start time, and it will associate data with any tags provided for that purpose. Basically the ACIF is a facility provided for archiving purposes so that when the print data set is created the index object is also created and the job is run. At some future time, the index object can be utilized to retrieve certain pages from the print data set. Such a function is very useful for reprinting mutilated pages.

The generation of tags and sending them directly to the TLE server agent 150 greatly extends the value of the TLE approach for generating DMI calls. In the TLE direct approach there is no data stream from which to field tags. Instead the tag is created and sent directly to the server in order to set the record in the database (through a DMI set) or retrieve a record in the database (through a DMI get). Once a tag is created, it is sent to the server over the network to the TCP-IP address on the network for the server. In a similar manner, the exit agent 120 sends tags to the server over the network. The invention provides a mechanism to address the database from anywhere in the network. As a consequence, the need for programming DMI calls and having skilled programmers who understand the DMI interface is reduced. The tag procedure provides a technique for desktop management of applications running on mainframes that are either difficult or impossible to change, and also provides a simple technique for generating the calls from any node on a network. If the BLDTLE utility is used there is no program associated with tagging; the user simply creates a file by component name, group name, attributes and keys stating what they want and the BLDTLE utility will build the tags and send them to the server agent. If the user wishes to generate the tags through C language programs an API function is provided to interface with the C language program to generate the tags and send them to the TLE server.

One other aspect of FIG. 9 is the creation of a batch file of tags into a TLE data set 170. That data set may include files of tags generated from any node on the network including the exit agent. The generation of a batch file of tags may be especially useful for some mainframe equipment. The data set may be located at the node which generated the tags or it may be at any location on the network.

Figure 10C:
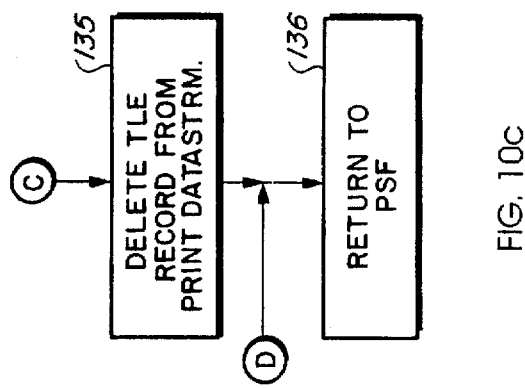
FIG. 10a–10c show the processing steps carried out by an exit agent at the host node to send records to the DMI node.
Figure 10B:
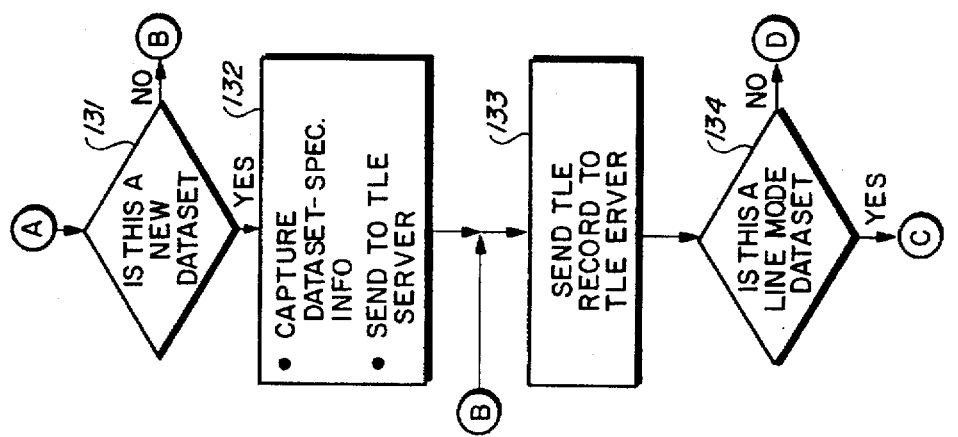
Figure 10A:
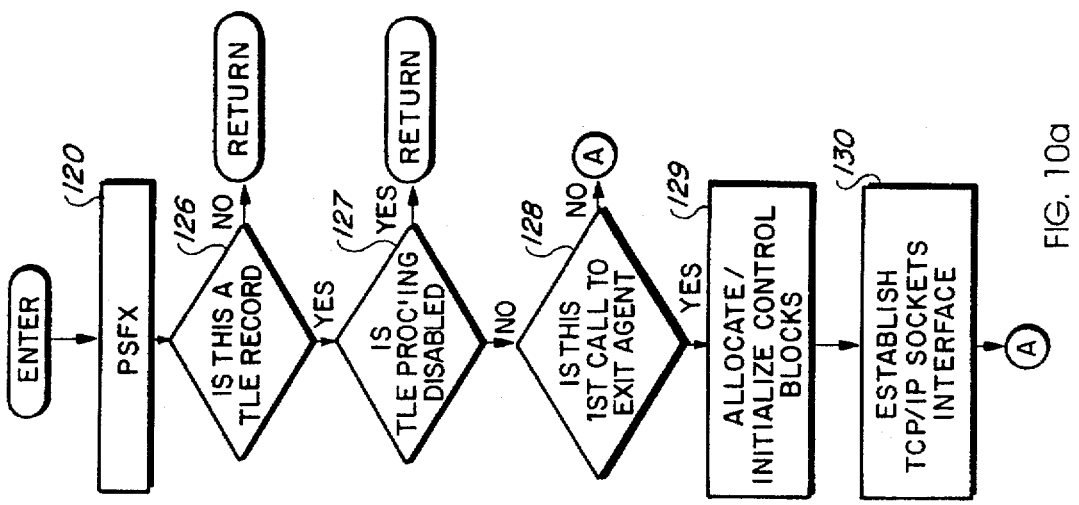

FIG. 10a–10c show the processing steps that are carried out by the exit agent 120. The exit agent will view all records in the data stream. When a TLE record is found at step 126 and if TLE processing is not disabled at step 127, the exit agent determines at step 128 whether the TLE record represents the first such record in the data stream. If it is, initialization functions are performed at steps 129 and 130. At step 129 various control blocks are formed to provide for working storage, for handles, for pointers, etc. At step 130 a socket is established for the TCP/IP data transmission scheme over the network 18.

After the performance of the initialization steps, the exit agent determines whether it is dealing with a new data set at step 131. If it is, certain data set specific information will be obtained and placed into the appropriate attribute fields of the tags before they are sent to the TLE server. It is at step 132 where the information mentioned above such as the time at which the print job is starting, is captured and set into the appropriate attribute value field. In the current implementation all tags are sent to the TLE server whether they are tagged specifically for the establishment of records in the DMI database or tags of some other kind. The current implementation places the processing of non-DMI tags at the TLE server rather than burdening the host with that processing step. At step 133 the records are sent out over the network to the TLE server and at step 134 the exit agent determines whether the tag was in a line mode data set. If it is, the tag must be deleted from the print data stream at step 135 so that the printer will not reject the print job. In the Advanced Function Printing system the printer will not accept a line mode data set and therefore a record of that type must be deleted from the data stream before it is sent to the printer. Once a record is processed, return is made to the print service facility at step 136.

FIG. 11a–11d shows the processing steps performed by the TLE server agent 150. The TLE server agent may be started either on demand through the reception of tags over the network or manually by appropriate command from the system user. For large print job applications it is desirable to read the entire MIF database and bring all ID values into the server agent storage area. The determination of whether the entire database is to be read is accomplished at step 152 and if so, the reading of that data and the storing of it in the server agent occurs at step 153. Generally, such an operation is desirable for large print jobs which may run for several days. Having all of the ID values stored in the server agent is an expeditious way of handling the setting and getting of the attribute values. However, for other applications where the server agent may be up for a repeated number of relatively short time periods, it is more desirable to obtain the required ID values as requests are made. In that case, the reading and storing of the entire MIF database at steps 152 and 153 is skipped.

Once a TLE server is ordered to start, a network session is commenced at step 154 by listening on the server's TCP/IP socket. When data is received through the socket the format of that TLE data is validated at step 155. Valid data is converted to the local format at step 156. Local format in the current implementation requires ASCII characters and a byte order reading from left to right according to Intel Corporation architecture. Should a character transform be required from EBCDIC to ASCII that processing is performed at step 156. Also, should the bytes be received in an order from right to left, a byte order transform is performed at step 156.

At step 157 the information in the structured fields of the TLE is parsed. Parsing ascertains the type of operation, that is, a DMI get or a DMI set or whatever other DMI function has been called for, together with the component name, the group name, keys that are needed and the attribute name and value.

At step 158 a determination is made as to whether the required MIF ID information is already available in the server agent data base. If the entire MIF database had been read into the server at step 152, the required ID information will be available. If however, that has not been done, a branch is made to step 159 to obtain the ID information through the service layer. The type of information obtained at step 159 are the IDs for the component, group and attribute information requested.

At steps 160 and 161, the TLE field setting forth the DMI operation is converted to the DMI format, together with constructing all of the necessary control blocks associated with the command operation that has been ordered. At step 162 the DMI Invoke command is issued to the service layer for the performance of DMI operations. One of the control blocks established at step 161 is a confirm buffer into which a service layer passes back the information requested. Once that information is present in the confirm buffer, it is parsed at step 163 and a return is made to the requesting entity at step 164. If a Set command had been issued a status of that operation is returned. If a Get command had been issued the requested attribute value data will be returned.

Figure 12:
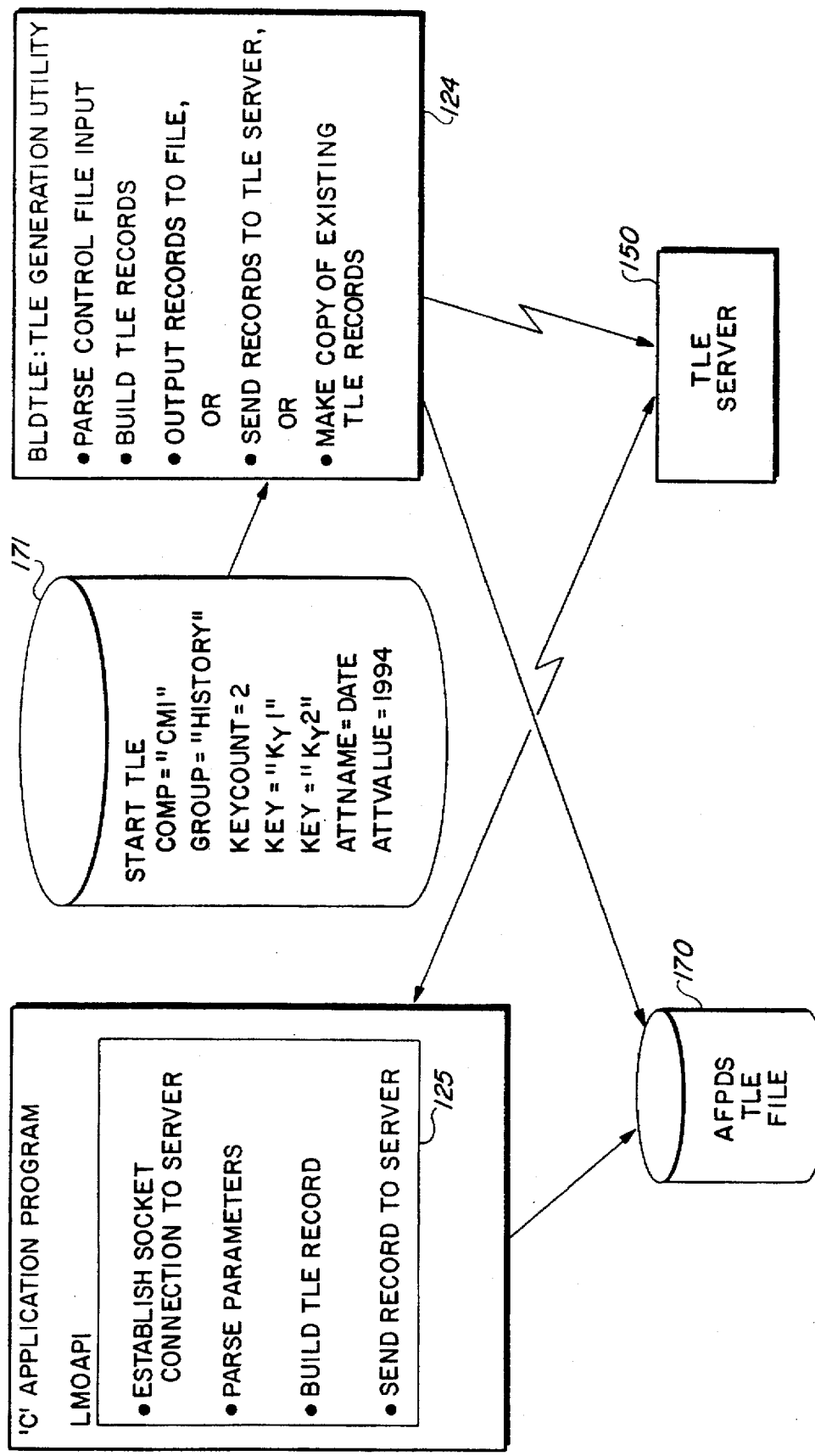
FIG. 12 shows an overall functional view of the various sending agents which interface with the server agent.

In FIG. 12 an overall functional view is shown of the agents required to implement the sending of tags directly to the TLE server. For example, where the user prepares a C language application program to designate those attributes needed for some management purpose, the C language program interfaces with an Application Program Interface (API) 125. The functions carried out by the API are to establish a socket connection to the server 150, to parse the parameters that it receives from the C language application program in order to build a TLE record, and send that record to the server. Once at the server, the processing steps set forth in FIG. 11a–11d are performed. Note that if desired the API can interface with the TLE file for the preparation of a batch TLE file.

If the user prefers to avoid a C language program, a BLDTLE utility 124 has been provided. In this case, the user would simply establish a human language TLE control file 171 in which the component is identified by its name, for example, "CM1", as shown in FIG. 12. The group is identified by its name, for example "history". The key count is established as two. The two keys are named, that is, "key 1" and "key 2". The attribute name is provided, for example, "date" and an attribute value is specified, for example, "1994". That control file is passed to the BLDTLE utility 124 which will parse the control file input, build the TLE record and then either output the record to a batch file 170 or send the records to the TLE server 150.

Once the TLE server 150 has performed its operations together with the DMI service layer, the status and data associated with the request are passed back to the user through either the utility 124 or over the API interface 125.

Details of the TLE support provided by the LMO API interface follows. The TLE record contains the name of the attribute to be set or gotten, the value associated with this attribute and the key values required to locate or set the desired table entry. The API interface follows a simple three step procedure. One, it establishes a TCP/IP socket connection with the TLE server; two, it establishes the specified values in the TLE format; and three, it closes the socket connection.

It may be noted that only one attribute can be set with each function call. However, the set attribute function may be issued as many times as desired. Therefore before the socket is closed, many set attribute TLEs can be sent over the network.

To initialize a socket session, issue the following:

| int LMOInitDmi | (int* | piDMIHandle, |
|---|---|---|
| | char* | hostname, |
| | char* | port); | where:
    piDMIHandle is the address of an integer field into which LMOInitDmi will store the handle to be used in all subsequent LMOAPI calls.

hostname is EITHER the TCP/IP hostname (e.g. LMOSRVR), or the dotted decimal IP address, of the server machine on which the TLESERV function is running.

port is the socket number to be used when connecting with the TLESERV function.

To terminate a socket session, issue the following:

| int LMOTermDmi | (int | iDMIHandle); |
|---|---|---| where:

iDMIHandle is the handle returned from Init

To set an attribute, issue the following:

| int LMOSetAttribute | (int | iDMIHandle, |
|---|---|---|
| | char* | pszCompName, |
| | char* | pszGroupName, |
| | int | iKeyCount, |
| | char* | Keys[], |
| | char* | pszAttributeName, |
| | char* | pszAttributeValue); | where:

iDMIHandle: the handle returned from Init pszCompName: a null-terminated string containing the name of the Component which contains the Attribute of interest (e.g. "LMO Product")

pszGroupName: a null-terminated string containing the name of the Group which contains the Attribute of interest (e.g. "Print History Table")

iKeyCount: the count of the number of keys to the Table (i.e. Group) which contains the Attribute to be set.

Note that DMI Groups are set up as keyed tables. Each row in the table reflects a unique combination of the attributes which have been identified as keys.

Keys: an array of pointers to null-terminated strings. Each string contains the value of the associated keys. The key values must be in the same order as the keys statement in the MIF that defines the component being updated.

See below for a description of how to create new rows.

pszAttributeName: a null-terminated string containing the name of the Attribute to be updated.

Note:

This name must match exactly the name defined in the MIF, including case and blank spaces.

pszAttributeValue: a null-terminated string containing the value to be assigned to the named attribute.

Note:

It is the caller's responsibility to ensure that the type of data provided matches the type of the attribute, as specified in the associated MIF. For example, if the MIF datatype is INT, the value provided to the LMOAPI must be a numeric value in displayable (i.e. ASCII or EBCDIC) format.

See the datetime section below for a description of how to get LMOAPI to provide the current time, in the required DMTF format.

An additional component of the TLE support is the BLDTLE utility. This utility allows the user to build a control file, contains instructions on what the TLE should look like and then have these instructions coverted into AFPDS TLE records. The output can be stored in a file, routed directly to the TLE server or, in the MVS environment, routed directly to PSF to be processed by the PSF LMO Exit routine.

The following example show the commands required to create one SetAttribute TLE. Note that the Symbolic Attribute DATETIME has been used (see Symbolic Attributes, below).

```
STARTTLE 1
DELIM,
    STARTTRIP 02
        TYPE OB
    ENDTRIP 02
    STARTTRIP 36
        TYPE 00
        COMP "LMO PRODUCT"
        GROUP "Print History Table"
        KEYCOUNT 3
        KEY "Product AAA"
        KEY "Product Instance 2"
        KEY "Test Job Name"
        ATTNAME "Print Start Time"
        ATTVALUE "&DATETIME"
    ENDTRIP 36
ENDTLE 1
... (as many TLEs as desired)
ENDALL
```

Note:

The DELIM field specifies what character is to be used to separate fields.

The STARTTRIP, ENDTRIP, TYPE fields never change.

The KEY fields specify the VALUES of the respective keys and must be in the same order as specified in the key=statement of the associated MIF.

The Value fields must match exactly (including case and spacing) the values in the MIF.

BLDTLE INVOCATION i—input file name o—output file name h—hostname (or IP address) of the TLE server n—port number to be used in communicating with the TLE server v—verbose mode; to get longer informational messages c—to copy AFPDS TLE records to another file or to the TLE server Note:

Parameters must be preceded by the minus ("–") sign.

PARAMETER COMBINATIONS

The input file name parameter is always required. The verbose parameter may be specified with any other combination of parameters.

If storing the output in a file, specify the output file name parameter.

If sending the output to the TLE server, specify the hostname parameter and the port parameter.

If performing a TLECopy operation (AFPDS TLEs in; AFPDS TLEs out), specify the copy parameter. When specifying the copy parameter, it is also valid to specify either output file name, or the hostname/port combination.

SYMBOLIC ATTRIBUTES

The TLESERVER component allows the user to specify certain runtime attributes as "symbolics" in the SetAttribute TLE. This function is useful for attributes whose values don't exist until the TLE is actually processed. The TLE is coded exactly as any other SetAttribute TLE, but the Attribute Value is the ampersand character ("&") followed by one of the symbolics in the table below. Note that several of these attributes only have meaning if the TLE was processed by the Print Services Facility.

| Symbolic | Description |
| --- | --- |
| FORMDEF | FORMDEF used for print |
| PFILNAME | PrintFile dataset name |
| PFILFORM | PrintFile format (e.g. LINE, MIXED) |
| JESID | JES-assigned ID |
| DEVICE | Current Printer |
| PJOBNAME | Print Job Name |
| DATETIME | Print Job Name |

Creating New Rows

In the DMTF model, as implemented in the LMO product, all Groups are viewed as Tables. This means that attributes are (logically) collected into rows, and a Table is viewed as a collection of (one or more) rows. Each table must have one or more attributes which are defined to be keys, and a row is defined by a unique set of values for these attributes.

There are thus two possibilities, when setting an attribute:

a) all key fields specify values which currently exist in the table, or b) one (or more) of the key values differ from the key values currently in the table.

In the first case (a), the named attribute is set to the specified value and all other attributes are left unchanged. In the second case, a new row is created. The named attribute is set to the specified value and all other attributes are set to their default value (if one has been provided in the MIF) or are set to a null value (undefined).

The DATETIME function

A frequent use of the DMTF model is to record event times, such as start-of-printing and end-of-printing. Since this will typically not be known by the application program that issues the LMOAPI, a special value, &DATETIME, is supported by the LMOAPI function. If the pszAttributeValue parameter has the value "&DATETIME", the current date/time—in the special MIF format will be stored in the appropriate attribute.

Note that this function does not preclude the caller from specifying an actual value in the pszAttributeValue parameter. However, in this situation, it is the caller's responsibility to create the date string in the required MIF format.

What has been provided is a DMI data stream tagging structure and processing capability that sets DMI attribute values from tags placed in a print data stream. It provides a generic implementation in which any read/write attribute value can be set in any group in any component. The tag structure used is compatible with ACIF and is supported in the MVS operating system by including an exit agent in the print service facility. Also, what has been provided is a TLE structure that can be established at any node on a network and sent to a server agent on the network.

The advantages of the invention include the ability to extend the DMI interface scheme to a network and provide a simple structure for passing commands and parameters from a node to the DMI server. The invention makes possible the placement of a host on a network with a desktop computer wherein the desktop computer contains programs to manage host applications and various other components on the network.

While the invention has been described above with respect to a specific embodiment it will be understood by those skilled in the art that various changes in form and detail may be made therein without departing from the spirit and scope of the invention. Again, changes in form and detail do not depart from the spirit and scope of the invention which receives definition in the following claims.

What is claimed:

1. A method of managing host applications by a management application wherein said host applications reside at a first node on a network and said management application resides at a second node, comprising:

providing a DMI node on said network with an object oriented database accessed through a Desktop Management Interface (DMI);

establishing a format comprising a tag structured field;

utilizing said tag structured field to indicate manageable records in the host data stream generated by said host application;

providing an exit agent at said host to split said tag structured field from said host data stream;

sending said tag structured field from said exit agent to said DMI node; and providing a tag server at said DMI node to parse said tag structured field and prepare DMI commands to address said data base, wherein said manageable records sent with said tag structured field are stored into said database for access by said management application.

2. A method enabling the communication of data from a first data processing node on a network to a second data processing node on said network for storing communicated data in a database of manageable data at said second node, said method utilizing a format for data to be communicated comprising a Tag Logical Element (TLE or tag) record, and wherein said second data processing node is provided with a Desktop Management Interface (DMI) and with said database, said database organized according to DMI format with component and attribute data and accessed through said DMI with DMI commands, said method comprising the steps of:

providing a procedure at said first data processing node for establishing component and attribute data in said TLE record and sending said TLE record over said network to said second data processing node; and providing a server procedure at said second data processing node for receiving said TLE record, parsing said record and developing DMI command data blocks from the TLE record in order to address said database through said DMI.

3. The method of claim 2 wherein said procedure at said first data processing node includes the steps of:

locating a TLE record in a datastream generated at said first data processing node; and splitting said TLE record out of said datastream generated at said first data processing node at the exit of said datastream from said first data processing node in order to send said TLE record to said second data processing node.

4. The method of claim 3 wherein the procedure at said first data processing node includes the steps of:

determining whether the TLE record is a new dataset, if it is, setting attribute value fields before sending said TLE record to said server procedure.

5. The method of claim 2 wherein said procedure at said first data processing node includes a utility procedure with the capability of receiving a control file prepared in human language, said method including the steps of:

receiving a user prepared control file;

parsing said control file; and building a TLE record.

6. The method of claim 2 wherein said procedure at said first data processing node is an application program interface (API) with the capability of performing the following steps:

receiving an application program designated parameters for said database;

parsing the parameters received from said application program; and building a TLE record.

7. A system enabling the communication of data from a first data processing node on a network to a second data processing node on said network for storing communicated data in a database of manageable data at said second node, said system utilizing a format for data to be communicated comprising a Tag Logical Element (TLE or tag) record, and wherein said second data processing node is provided with a Desktop Management Interface (DMI) and with said database, said database organized according to DMI format with component and attribute data and accessed through said DMI with DMI commands, said system comprising:

at said first data processing node, TLE means for establishing component and attribute data in said TLE record and means for sending said TLE record over said network to said second data processing node; and at said second data processing node, means for receiving said TLE record, parsing said record and developing DMI command data blocks from the TLE record in order to address said database through said DMI.

8. The system of claim 7 wherein said means for establishing further includes:

means for locating a TLE record in a datastream generated at said first data processing node; and means for splitting said TLE record out of said datastream generated at said first data processing node at the exit of said datastream from said first data processing node in order to send said TLE record to said second data processing node.

9. The system of claim 8 wherein said means for establishing further includes:

means for determining whether the TLE record is a new dataset, if it is, means for setting attribute value fields before sending said TLE record to said means for receiving said TLE record.

10. The system of claim 7 wherein said means for establishing includes utility means with the capability of receiving a control file prepared in human language, said utility means including:

means for receiving a user prepared control file;

means for parsing said control file; and means for building a TLE record.

11. The system of claim 7 wherein said means for establishing includes an application program interface (API) which includes:

means for receiving an application program designated parameters for said database;

means for parsing the parameters received from said application program; and means for building a TLE record.

12. A system for managing host (mainframe) applications by a management application where the host application resides at a first node on a network, the management application resides at any other node in the network including a node with desktop computing equipment and wherein a second node (DMI node) on the network is provided with a Desktop Management Interface (DMI) with an object-oriented database which is accessed through said DMI for storing data in the DMI format with components and attributes, and wherein a Tag Logical Element (TLE) record is placed in the datastream of said host and is utilized for communicating data from said host application to said DMI, said system comprising:

means for splitting said TLE from said datastream;

means for sending said TLE to said DMI node;

at said DMI node, means for parsing said TLE to prepare DMI commands to address said database; and means for passing said DMI, wherein data sent with said TLE is stored into said database for access by said management application commands to said DMI.

* * * * *

UNITED STATES PATENT AND TRADEMARK OFFICE
CERTIFICATE OF CORRECTION

PATENT NO. : 5,680,615
DATED : October 21, 1997
INVENTOR(S) : Marlin et al.

It is certified that error appears in the above-indentified patent and that said Letters Patent is hereby corrected as shown below:

On the title page: Item [56]
References cited should read as follows:

OTHER PUBLICATIONS

Steve Moore, "IBM Pledges Desktop Interface Support," Computerworld, Vol. 28, Issue 44, 10-31-94

Skip McAskill, "DMTF Finalizes Desktop Management Specification," Network World, Vol. 11, Issue 17, 4-25-94

In the Specification
   Col. 5, line 45:   change "DBM" to --IBM--

In the Claims
   Col. 24, line 36:   after "DMI" insert --commands to said DMI--

Column 24, line 38 delete – commands to said DMI –.

Signed and Sealed this

Tenth Day of November 1998

*Attest:*

BRUCE LEHMAN

*Attesting Officer*     *Commissioner of Patents and Trademarks*